United States Patent
Matsui et al.

(10) Patent No.: US 7,536,916 B2
(45) Date of Patent: May 26, 2009

(54) PRESSURE SENSOR

(75) Inventors: Hiroshige Matsui, Aichi-ken (JP); Inao Toyoda, Anjo (JP); Hisayuki Takeuchi, Oobu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/898,519

(22) Filed: Sep. 13, 2007

(65) Prior Publication Data

US 2008/0072680 A1  Mar. 27, 2008

(30) Foreign Application Priority Data

Sep. 27, 2006  (JP) ............................. 2006-262121

(51) Int. Cl.
*G01L 9/00* (2006.01)
(52) U.S. Cl. ...................................... 73/753
(58) Field of Classification Search ............... 73/715, 73/723, 726, 756
See application file for complete search history.

(56) References Cited

U.S. PATENT DOCUMENTS

| | | | |
|---|---|---|---|
| 5,488,868 A | 2/1996 | Ootake et al. | |
| 6,575,038 B1 * | 6/2003 | Takakuwa et al. | ............. 73/706 |
| 6,813,953 B2 * | 11/2004 | Baba et al. | ..................... 73/715 |
| 7,225,679 B2 * | 6/2007 | Miyagawa et al. | ............ 73/753 |
| 7,263,891 B2 * | 9/2007 | Oda | ............................ 73/715 |
| 2005/0199068 A1 * | 9/2005 | Yoshino | ........................ 73/715 |
| 2005/0252299 A1 * | 11/2005 | Oda | ............................ 73/715 |
| 2006/0090569 A1 * | 5/2006 | Myagawa et al. | ............. 73/753 |
| 2008/0148860 A1 * | 6/2008 | Murakami et al. | ............ 73/726 |

FOREIGN PATENT DOCUMENTS

| | | |
|---|---|---|
| JP | H07-019981 | 1/1995 |
| JP | 2007-114094 | 5/2007 |

* cited by examiner

*Primary Examiner*—Andre J Allen
(74) *Attorney, Agent, or Firm*—Posz Law Group, PLC

(57) ABSTRACT

The pressure sensor of the type having a pressure transmitting member transmitting a pressure received by a pressure-receiving diaphragm to a sensor chip is provided with a heat radiating member. This heat radiating member substantially suppresses the heat transferring from the pressure-receiving diaphragm to the sensor chip, to thereby preventing the pressure sensor from malfunction.

15 Claims, 4 Drawing Sheets

PRESSURE SENSOR

CROSS-REFERENCE TO RELATED APPLICATION

This application is related to Japanese Patent Application No. 2006-262121 filed on Sep. 27, 2006, the contents of which are hereby incorporated by reference.

BACKGROUND OF THE INVENTION

1. Field of the Invention

The present invention relates to a pressure sensor suitable in use for detecting a pressure in a combustion chamber of a vehicle engine.

2. Description of Related Art

As such a pressure sensor, there is known the one that has a configuration in which a diaphragm is located in one end portion of a case thereof, a distortion of the diaphragm caused by application of a pressure under measurement to a pressure-receiving surface thereof is transmitted through a pressure transmitting member to a sensor chip in which a distortion-sensing element is formed, and the distortion-sensing element outputs a signal depending on the transmitted distortion corresponding to the pressure under measurement. For details, refer to Japanese Patent Application Laid-open No. 7-19981, for example.

To mount the pressure sensor of the type described above on a vehicle engine, it is inserted from the pressure-receiving diaphragm side into a mounting hole of the vehicle engine leading to a combustion chamber of the engine, so that the pressure-receiving diaphragm is exposed to the combustion chamber side, and the sensor chip in which the distortion-sensing element is formed that should not be exposed to high temperature is applied with a force corresponding to the pressure in the combustion chamber through the pressure transmitting member.

The inventors of the present application proposed earlier a pressure sensor having a structure in which a sensor chip in which a distortion sensing element is formed is adhered to a thin-walled portion as a distortion section of a metal stem, so that a distortion of the distortion section due to a force corresponding to a pressure under measurement applied thereto through the pressure transmitting member causes the sensor chip to be distorted, and the distortion sensing element outputs a signal depending on the pressure under measurement. For details, refer to Japanese Patent Application Laid-open No. 2007-114094.

FIG. 4 is a cross-sectional view of such a pressure sensor mounted to a vehicle engine. In this figure, the dotted arrows indicate a heat transmission path in this pressure sensor.

As shown in FIG. 4, since a metal case J3 of the pressure sensor is in contact with a vehicle engine J5, there is formed a heat radiation path in which the heat transmitted from a combustion chamber J1 of the engine J5 to a pressure-receiving diaphragm J2 is radiated to the engine J5 through a contact portion between the metal case J3 and the engine J5.

However, there are also heat transmission paths in which the heat transfers to the sensor chip 4 through a metal stem J6 or a pressure transmitting member J7 disposed inside the metal case J3. Accordingly, there is a possibility that the temperature of the sensor chip J4 rises beyond an allowable operating temperature limit due to the heat transferring from the pressure-receiving diaphragm J2 side, causing the sensor chip J4 to malfunction.

In the structure shown in FIG. 4, the metal case J3 is divided into two components, a cylindrical metal pipe J8, and a housing J9. In assembling the pressure sensor, the metal stem J6 is fitted into an opening end of the metal pipe J8, and then they are integrated together by welding. After that, the metal pipe J8 integrated with the metal stem J6 is fitted into an opening end of the housing J9, and then they are integrated together by welding. Accordingly, most of the heat having been transmitted to the sensor chip J4 side beyond the opening end (weld portion) of the metal pipe J8, transfers to sensor chip J4 with little dissipation.

SUMMARY OF THE INVENTION

The present invention provides a pressure sensor comprising:

a case including therein a hollow portion;

a pressure-receiving diaphragm disposed at one end portion of the case, one surface thereof serving a pressure-receiving surface receiving a pressure under measurement, the pressure-receiving diaphragm being distorted upon being applied with the pressure at the pressure-receiving surface thereof;

a pressure transmitting member disposed in the hollow portion so as to be in contact, at one end thereof, with the other surface of the pressure-receiving diaphragm opposite to the pressure-receiving surface;

a stem member having a shape of a tube with a bottom and disposed in the hollow portion so as to be in contact with the other end of the pressure transmitting member at an inner surface of the bottom serving as a distortion section being distorted upon receiving the pressure at the inner surface through the other end of the pressure transmitting member; and a sensor chip disposed in the hollow portion on a side of an outer surface of the bottom of the stem member;

the case being constituted by the stem member, a metal pipe having one end to which the pressure-receiving diaphragm is fixed, and the other end to which an opening end of the stem member opposite to the distortion section is inserted, and a housing having a shape of a hollow cylinder with an opening end to which the other end of the metal pipe is inserted together with the stem member, wherein a heat radiating member is provided between an outer periphery of the stem member and an inner periphery of the housing so as to be in contact with the stem member and the housing.

The present invention also provides a pressure sensor comprising:

a case including therein a hollow portion;

a pressure-receiving diaphragm disposed at one end portion of the case, one surface thereof serving a pressure-receiving surface receiving a pressure under measurement, the pressure-receiving diaphragm being distorted upon being applied with the pressure at the pressure-receiving surface thereof;

a pressure transmitting member disposed in the hollow portion so as to be in contact, at one end thereof, with the other surface of the pressure-receiving diaphragm opposite to the pressure-receiving surface;

a stem member having a shape of a tube with a bottom and disposed in the hollow portion so as to be in contact with the other end of the pressure transmitting member at an inner surface of the bottom serving as a distortion section being distorted upon receiving the pressure at the inner surface through the other end of the pressure transmitting member; and a sensor chip disposed in the hollow portion on a side of an outer surface of the bottom of the stem member;

the case being constituted by the stem member, a metal pipe having one end to which the pressure-receiving diaphragm is fixed, and the other end to which an opening end of the stem member opposite to the distortion section is inserted, and a housing having a shape of a hollow cylinder with an opening end to which the other end of the metal pipe is inserted together with the stem member, the metal pipe is formed with, at an outer periphery thereof, a first sheet surface portion located more closely to the stem member than a joint portion with the housing, an outer diameter of the metal pipe at the first surface portion being gradually increased toward the stem member, the housing is formed with, at in inner periphery thereof, a second surface portion facing the first sheet surface portion, an inner diameter of the hosing at the second surface portion being gradually reduced toward the stem member, the first and second sheet surface portions being in contact with each other in a state of the metal pipe being fixed to the housing.

According to the present invention, it is possible to provide a pressure sensor of the type having a pressure transmitting member transmitting a pressure received by a pressure-receiving diaphragm to a sensor chip, in which the heat applied to the pressure-receiving diaphragm can be substantially suppressed from transferring to the sensor chip.

Other advantages and features of the invention will become apparent from the following description including the drawings and claims.

PREFERRED EMBODIMENTS OF THE INVENTION

Figure 1:
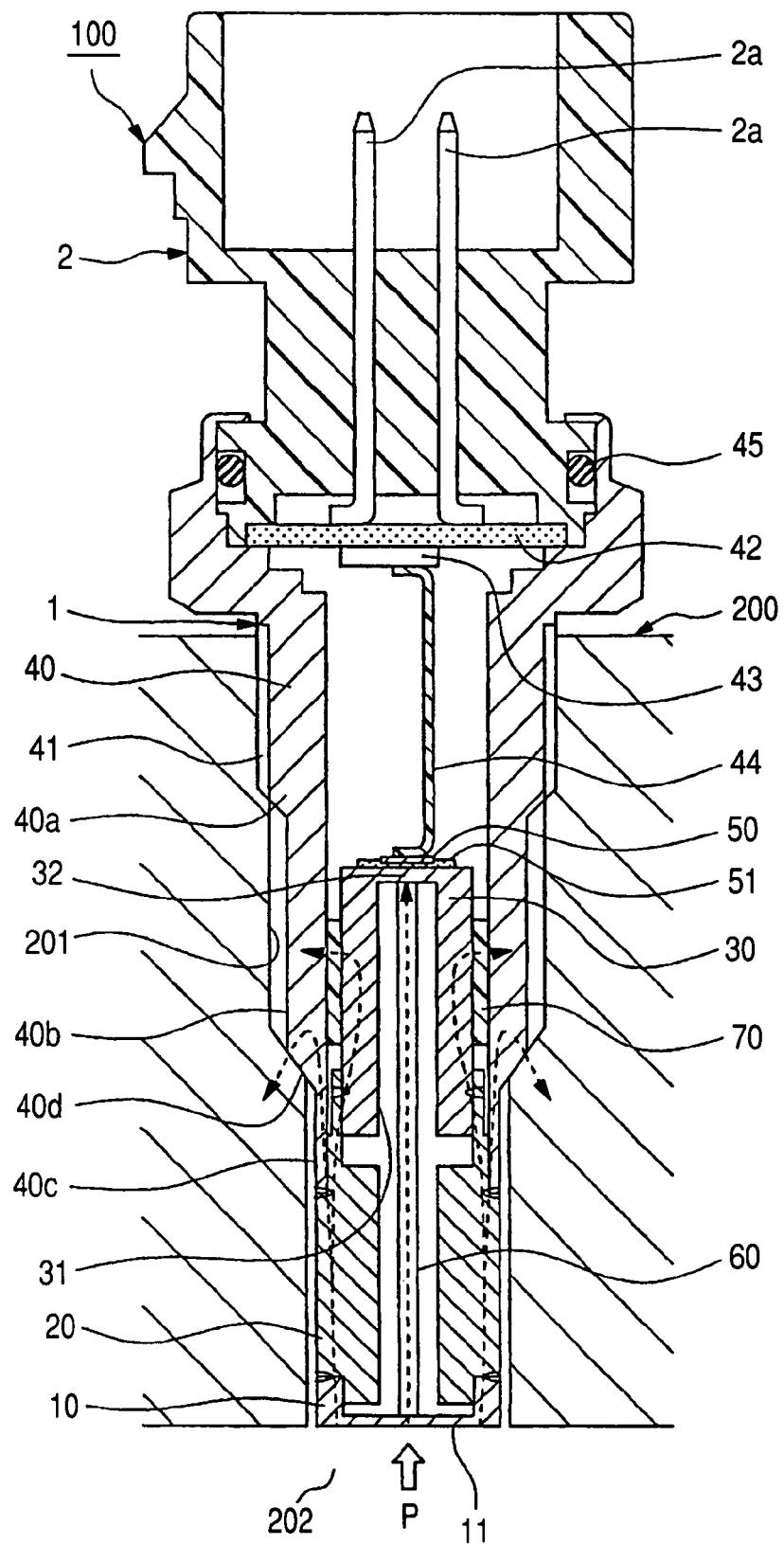
FIG. 1 is a cross-sectional view of a pressure sensor according to a first embodiment of the present invention in a state of being mounted on a vehicle engine.

In the following, embodiments of the present invention are described with reference to the accompanying drawings. In the description which follows and in the drawings, the identical or similar components bear the same reference numerals or characters.

First Embodiment

FIG. 1 is a cross-sectional view of a pressure sensor 100 according to a first embodiment of the present invention, which is mounted on a vehicle engine 200 to be used as a combustion pressure sensor for detecting a pressure in a combustion chamber 202 of the engine 200.

The pressure sensor 100 is constituted mainly by a case 1 and a connector section 2 coupled to the case 1. The engine 200 is formed with a mounting hole 201 leading to the combustion chamber 202. The case 1 of the pressure sensor 100 is inserted into the mounting hole 201 from one end portion thereof (may be referred to as a lower end portion hereinafter) so as to front the combustion chamber 202.

The case 1 includes a pressure-receiving diaphragm 10 at its one end portion. The case 1, which has a tubular shape, includes, at the side of the lower end portion thereof, a metal pipe 20 to one end of which the pressure-receiving diaphragm 10 is fixed, a metal stem 30 connected to the other end of the metal pipe 20, and a housing 40 to which the metal stem 30 and the metal pipe 20 are fixed. The connector section 2 is coupled to the other end portion (may be referred to as an upper end portion hereinafter) of the case 1.

The housing 40, which is made of metal such as a stainless steel, is formed with a screw thread portion 41 at its lateral surface, the screw thread portion 41 being engaged with the mounting hole 201 as a screw hole in order to fix the pressure sensor 100 to the engine 200.

As shown in FIG. 1, the housing 40 has a step-like shape in which its diameter decreases stepwise toward the pressure-receiving diaphragm side. Hereinafter, a portion of the housing 40 having the largest diameter at which the screw thread portion 41 is formed is referred to as a large-diameter portion 40a, a portion having the smallest diameter is referred to as a small-diameter portion 40c, and a portion having a diameter between those of the large-diameter portion and the small-diameter portion is referred to as an intermediate-diameter portion 40b. The intermediate-diameter portion 40b is connected to the small-diameter portion 40c through a tapered sheet surface portion 40d. Accordingly, the mounting hole 201 has a tapered sheet surface portion in its inside at a position facing the sheet surface portion 40d. When the pressure sensor 100 is thread-mounted on the engine 200, the tapered sheet surface portion 40d and the tapered sheet surface portion are brought into intimate contact with each other by an axial force to assure sealing between them.

The metal stem 30, which is made of metal such as a stainless steel in the shape of a tube with a bottom, includes an opening end 31 located on the metal pipe 20 side, and a bottom portion as a thin-walled distortion section 32 located on the housing 40 side. The opening end 31 of the metal stem 30 is inserted into the metal pipe 20. An outer diameter of the metal stem 30 is about the same as an inner diameter of the metal pipe 20 at its one end opposite to its other end to which the pressure-receiving diaphragm 10 is fixed.

The distortion section 32 of the metal stem 30 is distorted when a pressure P received by the pressure-receiving diaphragm 10 is applied thereto (or applied to an inner surface of the bottom portion of the metal stem 30) through a pressure transmission mechanism explained later. The distortion section 32 is provided with a sensor chip 50 in which there is formed a distortion sensing element generating a signal depending on the distortion of the distortion section 32.

The sensor chip 50 may be a semiconductor chip in which there is formed a distortion gauge of the Wheatstone bridge circuit type constituted by diffused resistors etc. The sensor chip 50 is adhered to the distortion section 32 through a low-melting glass 51.

The pressure-receiving diaphragm 10 is fixed to the one end of the metal pipe 20 made of metal such as a stainless steel in the shape of a tube. The thickness of the other end of the metal pipe 20 is thinned by making, at this other end, the inner diameter larger, while making the outer diameter smaller. The metal stem 30 is inserted into this thin-walled end of the metal pipe 20, and then they are integrated together by welding, brazing, or bonding.

One end surface 11 of the pressure-receiving diaphragm 10 which is made of metal such as a stainless steel in the shape of a circular disk serves as a pressure-receiving surface receiving the pressure P in the combustion chamber 202 as a pressure to be measurement. Hereinafter the end surface 11 is referred to as a pressure-receiving surface.

The pressure P in the combustion chamber 202 of the engine 200 on which the pressure sensor 100 is mounted is applied to the pressure-receiving surface 11 of the pressure-receiving diaphragm 10 located on the side of the lower end portion of the case 10 as indicated by the arrow in FIG. 1, as a consequence of which the pressure-receiving diaphragm 10 is distorted to be deformed.

There is provided a pressure transmitting member 60 in a space defined by a hollow portion of the metal stem 30 and a hollow portion of the metal pipe 20. In this embodiment, the pressure transmitting member 60 is made of metal such as a stainless steel or ceramics in a bar-like shale.

The pressure transmitting member 60 is in contact with the distortion section 32 of the metal stem 30 at one end thereof, and in contact with a surface of the pressure-receiving diaphragm 10 opposite to the pressure-receiving surface 11 at the other end thereof in a state of applying a load to them, so that the pressure P is applied to the distortion section 32 of the metal stem 30 through this pressure transmitting member 60.

As shown in FIG. 1, there is disposed a printed wiring board 42 such as a ceramic board in the housing 40. On this printed wiring board 42, there is mounted an IC chip 43. The IC chip 43 is electrically connected to the printed wiring board 42 through not-shown bonding wires. The IC chip 43 is formed with a circuit operating to amplify and adjust an output signal of the sensor chip 50.

As shown in FIG. 1, the IC chip 43 and the sensor chip 50 are electrically connected to each other through a wiring member 44 including lead wires and a flexible printed circuit board (FPC).

The connector section 2 is coupled to the housing 40 through an O-ring 45. The connector section 2, which is made of resin, is integrated with a metal terminal 2a by insert molding. This connector section 2 is crimped to the housing 40 in a state of one end thereof being inserted into the opening end portion of the housing 40, so that they are integrated together.

The terminal 2a of the connector section 2 is electrically connected to the printed wiring board 42 within the housing 40. The terminal 2a is made electrically connectable to a vehicle ECU (Electronic Control Unit), so that the pressure sensor 100 can exchange signals with outside.

The pressure sensor 100 is provided with a heat radiating member 70 between an outer periphery of the metal stem 30 and an inner periphery of the housing 40, the heat radiating member being located more closely to the distortion section 32 than the joint portion between the metal stem 30 and the metal pipe, and the sheet surface portion 40d. The heat radiating member 70 may be a tubular member through which the metal stem 30 is inserted, or a sheet member wound around the metal stem 30. The heat radiating member 70 has such a thickness that it contacts both the outer periphery of the metal stem 30 and the inner periphery of the housing 40. For example, when the heat radiating member 70 is a tubular member, and the outer diameter of the metal stem 30 is 4 mm, the heat radiating member 70 is formed to have an inner diameter of 4 mm and an outer diameter of 5 mm. On the other hand, when the heat radiating member 70 is a sheet member, and the outer diameter of the metal stem 30 is 4 mm, the heat radiating member 70 is formed to have a thickness of 0.5 mm.

The heat radiating member 70, which is required to have a higher heat conductivity than air, may be made of a heat-radiating rubber such as a silicone rubber mixed with a metal powder, carbon, or a ceramic material, or a heat-radiating gel mixed with metal such as aluminum, copper and solder, a metal powder, carbon, or a ceramic material.

The pressure sensor 100 having the above described structure operates on electric power supplied through the terminal 2a. The signal depending on the pressure P received by the pressure-receiving diaphragm 10 outputted from the sensor chip 50 is transmitted to the IC chip 43 through the wiring member 44 where it is subjected to a signal processing, and then outputted through the printed wiring board 42 and the terminal 2a.

As described above, the pressure sensor 100 is provided with the heat radiating member 70 disposed between the outer periphery of the metal stem 30 and the inner periphery of the housing 40 so as to be in contact with them.

Accordingly, in this embodiment, in addition to the heat radiation path in which the heat directly transmitted from the metal pipe 20 to the housing 40 is radiated to the engine 200 through the sheet surface portion 40d, there is provided another heat radiation path indicated by the dotted arrows in FIG. 1 in which the heat transmitted from the metal pipe 20 to the metal stem 30 is further transmitted to the housing 40 through the heat radiating member 70, and afterwards it is radiated to the engine 200 through the sheet surface portion 40d, and the screw thread portion 41. Since this additional heat radiation path is formed more closely to the sensor chip 50 than in the prior art pressure sensor proposed by the inventors of the present invention, according to this embodiment, it is possible to suppress the heat being transmitted to the metal stem 30 from transferring to the sensor chip 50, to thereby prevent the temperature of the sensor chip 50 from rising beyond an allowable operating temperature limit causing the pressure sensor 100 to malfunction.

Actual measurements shows that the temperature of the sensor chip 50 rises to nearly 200 degrees C. when there is not provided the heat radiating member 70, while it rises to only about 100 degrees C. when there is provided the heat radiating member 70.

Second Embodiment

Figure 2:
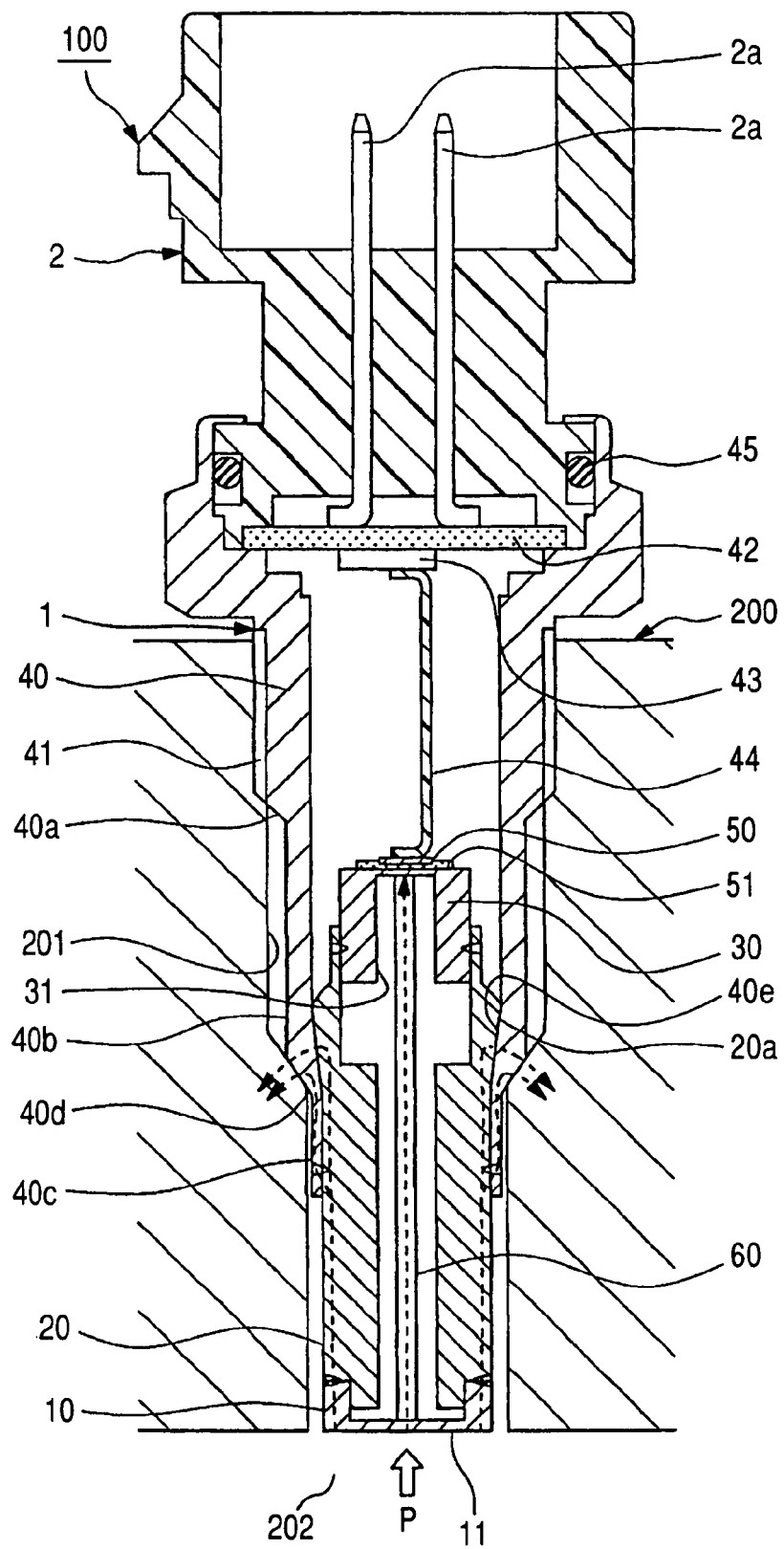
FIG. 2 is a cross-sectional view of a pressure sensor according to a second embodiment of the present invention in a state of being mounted on a vehicle engine.

Next, a second embodiment of the present invention is explained. FIG. 2 is a cross-sectional view of a pressure sensor 100 according to the second embodiment of the present invention, which is mounted on a vehicle engine 200. The following explanation focuses on differences between the first embodiment and the second embodiment.

As shown in FIG. 2, in this embodiment, the inner diameter of the housing 40 is reduced on the pressure-receiving diaphragm 10 side, so that a tapered sheet surface portion 40e is formed in the hollow portion of the housing 40. This sheet surface portion 40e is formed more closely to the metal stem 30, that is, more remotely from the pressure-receiving diaphragm 10 than the sheet surface portion 40d formed in the outer periphery of the housing 40. In addition, the outer diameter of the metal pipe 20 is increased on the metal stem 30 side, so that a tapered sheet surface portion 20a corresponding to the sheet surface portion 40e is formed. The angle of inclination of the surface of the sheet surface portion 20a and the sheet surface portion 40a to the longitudinal axis of the pressure sensor 100 is set smaller than that of the sheet surface portion 40d of the housing 40 in order to make a contact area between the sheet surface portion 40e and the sheet surface portion 20a as large as possible, to thereby radiate the heat in large quantity.

The inner diameter of the housing 40 and the outer diameter of the metal pipe 20 are set to such values that the metal pipe 20 can be pressure-inserted into the housing 40 at a position closer to the metal stem 30 than the position of the joint portion between the metal pipe 20 and the housing 40. This makes it possible that the metal pipe 20 and the housing 40 can be in contact with each other not only at the sheet surface portions 20a, 40e, but also at the side of the pressure-receiving diaphragm 10.

The outer diameter of the metal pipe 20 is further reduced to further thin the thickness thereof at its upper end portion opposite to its lower end portion to which the pressure-receiving diaphragm 10 is fixed. The metal stem 30 is inserted into the metal pipe 20, and they are integrated together by welding, brazing, or bonding at this thinned upper end portion. Although the metal stem 30 of the second embodiment is not different in basic structure from the metal stem 30 of the first embodiment, the length of the metal stem 30 is made small in the second embodiment to form the sheet surface portion 20a in the metal pipe 20.

As explained above, the pressure sensor 100 of the second embodiment has such a structure that the sheet surface portion 20a is formed in the outer periphery of the metal pipe 20, and the sheet surface portion 40e is formed in the inner periphery of the housing 40, these sheet surface portions 20a, 40e being located more closely to the metal stem 30 than the sheet surface portion 40d which makes a contact surface between the housing 40 and the engine 200.

Accordingly, in addition to the heat radiation path in which the heat directly transmitted from the metal pipe 20 to the housing 40 is radiated to engine 200 through the sheet surface portion 40d, there is provided another heat radiation path indicated by the dotted arrows in FIG. 2 in which the heat transmitted from the metal pipe 20 to the metal stem 30 is further transmitted to the housing 40 through the sheet surface portions 20a, 40e, and afterwards radiated to the engine 200 through the sheet surface portion 40d, and the screw thread portion 41. Since this additional heat radiation path is formed more closely to the sensor chip 50 than in the prior art pressure sensor proposed by the inventors of the present invention, according to this embodiment, it is possible to suppress the heat having been transmitted to the metal stem 30 from transferring to the sensor chip 50, to thereby prevent the temperature of the sensor chip 50 from rising beyond an allowable operating temperature limit causing the pressure sensor 100 to malfunction.

The inner diameter of the housing 40 and the outer diameter of the metal pipe 20 are set to such values that the metal pipe 20 can be pressure-inserted into the housing 40 at a position closer to the metal stem 30 than the position of the joint portion between the metal pipe 20 and the housing 40, so that the metal pipe 20 and the housing 40 can be in contact with each other not only at the sheet surface portions 20a, 40e, but also at the side of the pressure-receiving diaphragm 10. This makes it possible to increase the heat transmission quantity in the direction from the metal pipe 20 to the housing 40, to thereby suppressing the heat from transferring to the sensor chip 50.

Other Embodiments

Although the pressure sensor 100 of the first embodiment features the provision of the heat radiating member 70, and the pressure sensor 100 of the second embodiment features the provision of the sheet surface portions 20a, 40, it is possible to combine these features.

Figure 3:
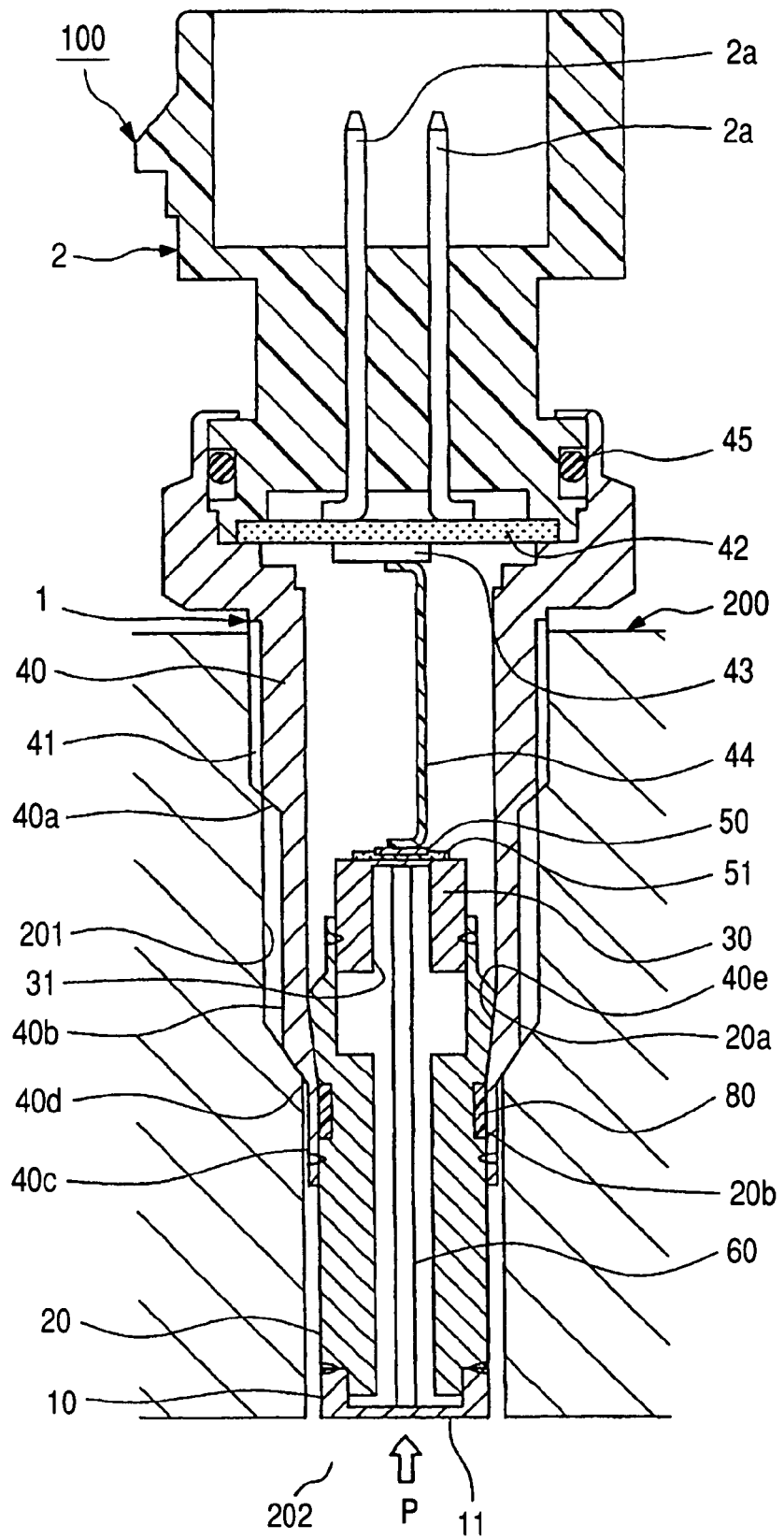
FIG. 3 is a cross-sectional view of a pressure sensor according to a variant of the second embodiment of the present invention in a state of being mounted on a vehicle engine.
Figure 4:
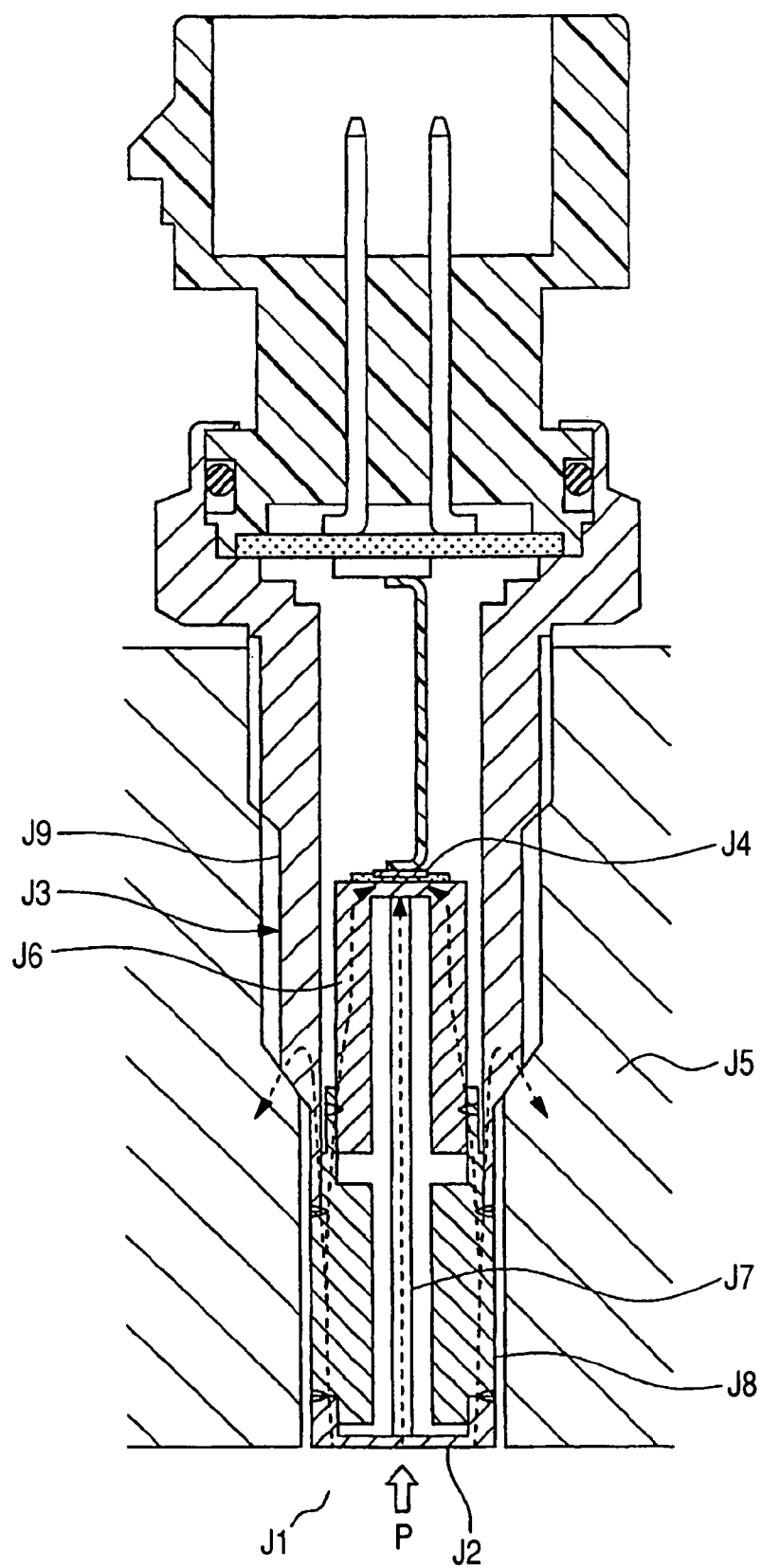
FIG. 4 is a cross-sectional view of a prior art pressure sensor proposed by the inventors of the present invention.

In the second embodiment, the metal pipe 20 is pressure-inserted into the housing 40 at a position closer to the metal stem 30 than the position of the joint portion between the metal pipe 20 and the housing 40. However, there may be provided a clearance between the outer periphery of the metal pipe 20 and the inner periphery of the housing 40, because the heat can be transmitted through the sheet surface portions 20a, 40e. In this case, since the heat transmission quantity in the direction from the metal pipe 20 to the housing 40 becomes smaller than the second embodiment, it may be preferable to form a groove 20b in the metal pipe 20 more closely to the pressure-receiving diaphragm 10 than the sheet surface portion 20a, and fit a heat radiating member 80 in the groove 20b as shown in FIG. 3. The heat radiating member 80 may be made of the same material as the heat radiating member 70 in the first embodiment. It is also possible to dispose the heat radiating member 80 between the sheet surface portions 20a, 40e.

Instead of forming the groove 20b in the meta pipe 20, there may be formed a groove in the inner periphery of the housing 40. When the heat radiating member 80 is made of a sufficiently thin material, it may be inserted between the metal pipe 20 and the housing 40 without forming a groove in the metal pipe 20 or the housing 40.

The above explained preferred embodiments are exemplary of the invention of the present application which is described solely by the claims appended below. It should be understood that modifications of the preferred embodiments may be made as would occur to one of skill in the art.

What is claimed is:

1. A pressure sensor comprising:
a case including therein a hollow portion;
a pressure-receiving diaphragm disposed at one end portion of said case, one surface thereof serving a pressure-receiving surface receiving a pressure under measurement, said pressure-receiving diaphragm being distorted upon being applied with said pressure at said pressure-receiving surface thereof;
a pressure transmitting member disposed in said hollow portion so as to be in contact, at one end thereof, with the other surface of said pressure-receiving diaphragm opposite to said pressure-receiving surface;
a stem member having a shape of a tube with a bottom and disposed in said hollow portion so as to be in contact with the other end of said pressure transmitting member at an inner surface of said bottom serving as a distortion section being distorted upon receiving said pressure at said inner surface through said other end of said pressure transmitting member; and
a sensor chip disposed in said hollow portion on a side of an outer surface of said bottom of said stem member;
said case being constituted by said stem member, a metal pipe having one end to which said pressure-receiving diaphragm is fixed, and the other end to which an opening end of said stem member opposite to said distortion section is inserted, and a housing having a shape of a hollow cylinder with an opening end to which said other end of said metal pipe is inserted together with said stem member,
wherein a heat radiating member is provided between an outer periphery of said stem member and an inner periphery of said housing so as to be in contact with said stem member and said housing.

2. The pressure sensor according to claim 1, wherein said heat radiating member is located between a junction portion between said stem member and said metal pipe, and said distortion section.

3. The pressure sensor according to claim 1, wherein said heat radiating member is a tubular member through which said stem member is inserted.

4. The pressure sensor according to claim 1, wherein said heat radiating member is a sheet member wound around said stem member.

5. The pressure sensor according to claim 1, wherein said heat radiating member is made of a heat-radiating rubber mixed with a metal powder, carbon, or a ceramic material.

6. The pressure sensor according to claim 1, wherein said heat radiating member is made of heat-radiating gel mixed with metal, a metal powder, carbon, or a ceramic material.

7. The pressure sensor according to claim 1, wherein
said metal pipe is formed with, at an outer periphery thereof, a first sheet surface portion located more closely to said stem member than a joint portion with said housing, an outer diameter of said metal pipe at said first surface portion being gradually increased toward said stem member, and
said housing is formed with, at an inner periphery thereof, a second surface portion facing said first sheet surface portion, an inner diameter of said hosing at said second surface portion being gradually reduced toward said stem member,
said first and second sheet surface portions being in contact with each other in a state of said metal pipe being fixed to said housing.

8. The pressure sensor according to claim 7, wherein said first and said second sheet portions have a tapered shape.

9. The pressure sensor according to claim 7, wherein said housing is formed at an outer periphery thereof a third sheet surface portion having a tapered shape, an outer diameter of said housing at said third sheet surface portion being gradually reduced toward said pressure-receiving diaphragm, said first and second sheet surface portions being located at a position closer to said distortion section than a position at which said third sheet surface portion is located.

10. The pressure sensor according to claim 7, further comprising a heat radiating member disposed between an outer periphery of said metal pipe and an inner periphery of said housing so as to be located closer to said pressure-receiving diaphragm than are said first and second sheet surface positions.

11. A pressure sensor comprising:
a case including therein a hollow portion;
a pressure-receiving diaphragm disposed at one end portion of said case, one surface thereof serving a pressure-receiving surface receiving a pressure under measurement, said pressure-receiving diaphragm being distorted upon being applied with said pressure at said pressure-receiving surface thereof;
a pressure transmitting member disposed in said hollow portion so as to be in contact, at one end thereof, with the other surface of said pressure-receiving diaphragm opposite to said pressure-receiving surface;
a stem member having a shape of a tube with a bottom and disposed in said hollow portion so as to be in contact with the other end of said pressure transmitting member at an inner surface of said bottom serving as a distortion section being distorted upon receiving said pressure at said inner surface through said other end of said pressure transmitting member; and
a sensor chip disposed in said hollow portion on a side of an outer surface of said bottom of said stem member;
said case being constituted by said stem member, a metal pipe having one end to which said pressure-receiving diaphragm is fixed, and the other end to which an opening end of said stem member opposite to said distortion section is inserted, and a housing having a shape of a hollow cylinder with an opening end to which said other end of said metal pipe is inserted together with said stem member,
said metal pipe is formed with, at an outer periphery thereof, a first sheet surface portion located more closely to said stem member than a joint portion with said housing, an outer diameter of said metal pipe at said first surface portion being gradually increased toward said stem member,
said housing is formed with, at in inner periphery thereof, a second surface portion facing said first sheet surface portion, an inner diameter of said hosing at said second surface portion being gradually reduced toward said stem member,
said first and second sheet surface portions being in contact with each other in a state of said metal pipe being fixed to said housing.

12. The pressure sensor according to claim 11, wherein said first and said second sheet portions have a tapered shape.

13. The pressure sensor according to claim 11, wherein said housing is formed with, at an outer periphery thereof, a third sheet surface portion having a tapered shape, an outer diameter of said housing at said third sheet surface portion being gradually reduced toward said pressure-receiving diaphragm, said first and second sheet surface portions being located more closely to said distortion section than said third sheet surface portion.

14. The pressure sensor according to claim 11, further comprising a heat radiating member disposed between said outer periphery of said metal pipe and said inner periphery of said housing, and located more closely to said pressure-receiving diaphragm than said first and second sheet surface positions.

15. The pressure sensor according to claim 1, wherein the heat radiating member is located to form a heat transfer path for removing heat from the vicinity of the sensor chip.

* * * * *